July 10, 1951  M. GRAVINA ET AL  2,559,765
CLUTCH AND BRAKE PILOT MECHANISM
Filed Aug. 20, 1945  4 Sheets—Sheet 2

Inventors:
M. Gravina and
M. Hawadia
By E. F. Wendroth
Atty

July 10, 1951
M. GRAVINA ET AL
2,559,765
CLUTCH AND BRAKE PILOT MECHANISM
Filed Aug. 20, 1945
4 Sheets-Sheet 4
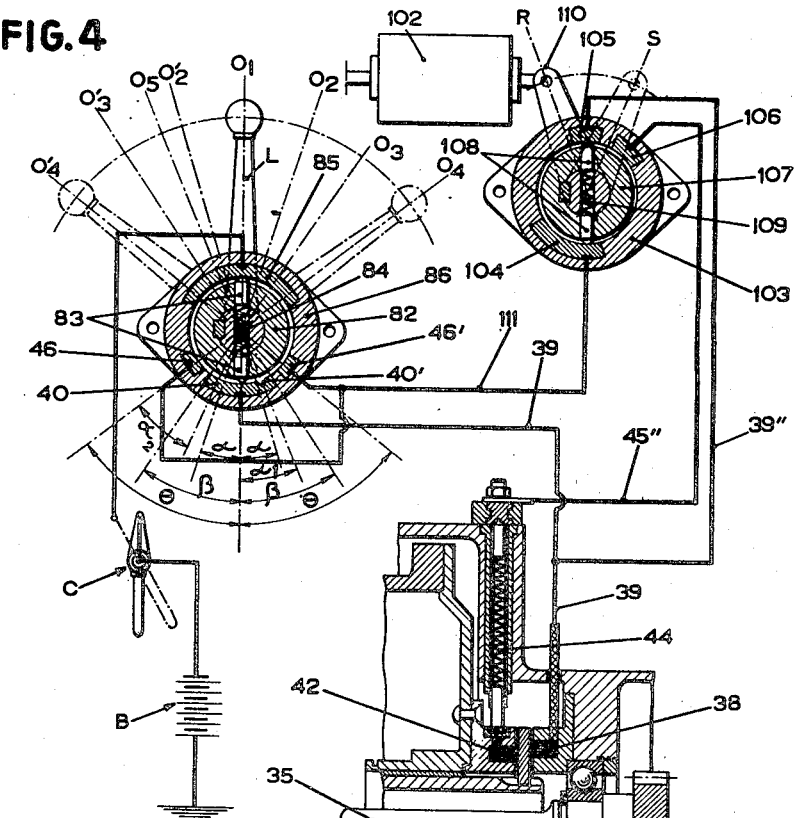
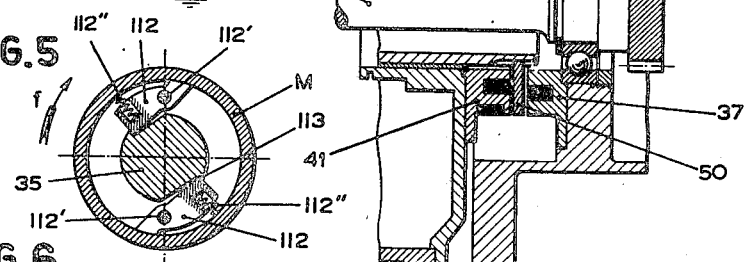
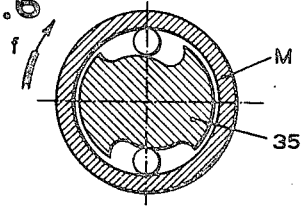

Patented July 10, 1951

2,559,765

UNITED STATES PATENT OFFICE 2,559,765

CLUTCH AND BRAKE PILOT MECHANISM

Michel Gravina and Marcel Hawadier, Paris, France; said Hawadier assignor to said Gravina Application August 20, 1945, Serial No. 611,564
In France April 21, 1941

Section 1, Public Law 690, August 8, 1946
Patent expires April 21, 1961

7 Claims. (Cl. 192—12)

The present invention relates to clutch devices including two coaxial members, a driving one and a driven one, adapted to be brought into frictional engagement with each other by centrifugal weight means mounted on a weight carrier which can be either coupled with the driving member of the device or braked with respect to a fixed casing or other fixed part by an auxiliary clutch and brake device.

The object of our invention is to obtain an easy and smooth working of a clutch device of this kind.

To this effect, according to our invention, said centrifugal weight means act on a clutch engaging element rotating with one of said members to bring the members into engagement with each other, through a transmission including an antifriction bearing accommodating relative rotation of said weight carrier member and said clutch engaging element.

Preferred embodiments of our invention will be hereinafter described with reference to the accompanying drawings, given merely by way of example, and in which:

Fig. 4 is a partial sectional view of the clutch of Fig. 3, the circuits being controlled by a speed change lever and by a centrifugal governor.

Figure 1:
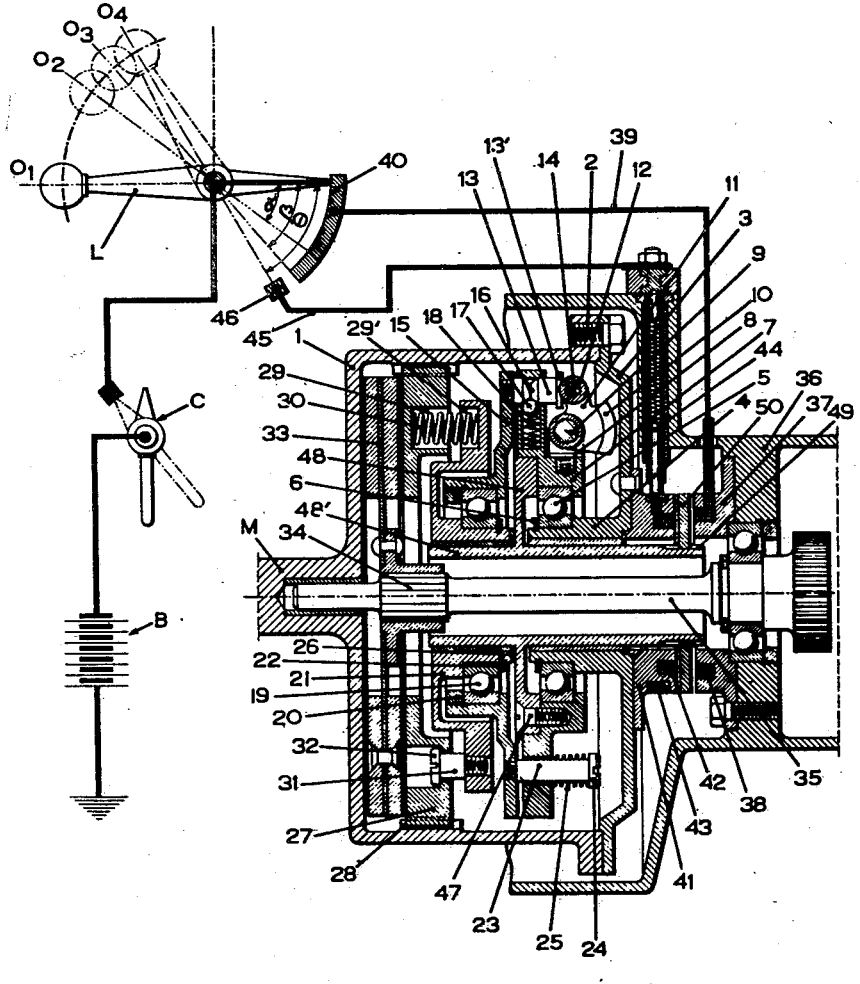
Fig. 1 is an axial sectional view of a first embodiment of the invention where the auxiliary device which controls the operation of the weight carrying mechanism is controlled electrically.

Referring first to Fig. 1, the driving shaft M is formed with a drum 1 containing therein the centrifugal clutch and closed by a plate 3 fixedly secured to said drum by means of screws 2. The central hub portion 4 of said plate 3 has mounted thereon the inner race of an antifriction ball thrust bearing 5 urged against a shoulder of said hub 4 by means of a clip ring 6.

The outer race of said bearing has mounted thereon a plate 7 having secured thereto a plurality of circumferentially spaced yokes 8 (a single one being shown in the drawing) which comprise each one pivot axle 9 for one centrifugal weight 10. Each of said centrifugal weights comprises, on the one hand, a part of great mass having its centre of gravity suitably arranged to provide a centrifugal force as great as possible (said part extending outwardly from the plate 7 with regard to its associated pivot 9); and, on the other hand, a projecting part 11 of smaller mass formed with a bore 12.

Opposite each bore 12, the plate 7 is provided with a bore having axially and slidably mounted therein a push-rod 13 one end of which bears against a bolt 14 mounted in said bore 12 and the other end of which is secured to a spider 15, the central part of each push-rod being formed with a groove 16 cooperating with a ball 17 which is urged into engagement therewith by a spring 18 mounted in a radial recess of the plate 7.

The latter arrangement is provided in order yieldingly to keep the centrifugal weights in inoperative position as long as the weight carrying plate turns at a speed lower than a given designed speed.

The spider 15 is mounted on an antifriction ball thrust-bearing 19 having the outer race thereof held against a shoulder of said spider by means of a nut 20, the inner race of said bearing being secured on the hub portion of a spider 21, being held against a shoulder thereof by means of a clip ring 22. The spider 15 has also screwed therein a plurality of bolts 23 adapted to freely slide in bores of said plate 7 and formed with head members 24 providing bearings for return springs 25 the other bearing of which is formed by said plate 7. A distance ring 26 is mounted between the spider 15 and the plate 7.

The plate 7 and the spider 15 are thus shown as connected for rotation with each other through said bolts 23 and push-rods 13, the spider 15 being also free to move axially.

The drum 1 comprises therein a presser plate 27 which constitutes the clutch engaging element and is connected for rotation therewith through splines 28 and comprising a plurality of recesses 29 respectively in line with a plurality of recesses 29' provided in said spider 21, with the clutch springs 30 mounted in registering recesses 29, 29'.

The plate 27 and the spider 21 are connected for rotation with each other through a plurality of bolts 31 having one end thereof secured to the spider 21 and the other end formed with a head member 32 which forms an abutment for the plate 27 when the latter tends to move away from the spider 21 under the action of the springs 30. In other words, the plate 27 and the spider 21 can move towards each other but can not move away beyond the limit defined by the head members 32 of the bolts 31.

Between the plate 27 and the drum 1 integral with the driving shaft (which drum may be, for instance, the flywheel of the engine) is mounted the clutch disc 33 which constitutes the driven member of the clutch and is connected for rotation through splines 34 with the driven shaft 35.

The clutch-engaging axial thrust of the masses 10 thus acts on the clutch-engaging element or presser-plate 27, through the ball thrust-bearing 19 and the spider 15, which latter is freely rotatable with respect to the plate 27.

The fixed casing 36 or other fixed part has fixedly secured thereto by any convenient means an annular electromagnet 37 having its winding 38 electrically connected through a cable 39 with a segmental contact 40.

The plate 3 has fixedly secured thereto by any convenient means an electromagnet 41 having its winding 42 electrically connected with a slip ring 43 adapted to receive current from a brush 44 electrically connected through a wire 45 with a contact 46.

The plate 7 has fixedly secured thereto by means of screws 47 or any other similar means a flange 48 formed with a central hub portion 48' having one of its ends formed with splines 49 for axial sliding thereon of an armature 50 mounted between the electromagnets 37 and 41.

In the embodiment of our invention shown by the drawing, our clutch (which permits complete elimination of the clutch pedal on a vehicle) is controlled exclusively by means of a lever L controlling the engagement of first speed and neutral in a change speed gear associated with the clutch and simultaneously with the changes of positions of the latter.

The presser plate 27 constitutes the engaging element of the clutch. The weights 10 are the centrifugal weight means. The plate 7 is the weight carrier member. Parts 13, 15, 19, 21, 30 form the transmission between the centrifugal means 10 and the friction element 27 to be brought into engagement with the other one, thrust bearing 19 constituting the antifriction bearing as hereinbefore referred to.

We will now describe the operation of this clutch; for the sake of simplicity it will be supposed that the device is applied to a motor car comprising a plurality of speeds.

As soon as the ignition switch C of the engine is closed (by moving from the position in full lines to the position in dash-and-dot lines), current flows from the battery B through the lever L which is in the neutral position $O_1$, the segmental member 40 and the wire 39 into the winding of the fixed electromagnet 37. Therefore the armature 50 is attracted to the stationary electromagnet 37 and, by reason of said armature being connected for rotation with the weight carrying plate 7, the latter remains stationary, regardless of the speed of rotation of the engine.

In order to start the vehicle, lever L is moved from position $O_1$ to position $O_4$ through an angle $\theta$. During this movement, the lever L is moved first to a position $O_2$ through an angle $\alpha$, and during this part of the movement the change speed device (not shown) is operated by the lever L to engage the first speed. The rotation is pursued to an angle $\beta$ corresponding to a position $O_3$ of lever L. Before reaching this latter position, the lever L has ensured continuous feeding of current to the stationary electromagnet 37. Beginning from position $O_3$ the circuit of said stationary electromagnet is opened, and as soon as the lever has reached the position $O_4$, corresponding to angle $\theta$, a current is caused to flow through electromagnet 41 which is connected for rotation with the driving shaft M. Said electromagnet attracts the armature 50, thus connecting the plate 7 for rotation with the electromagnet 41 and therefore with the drum 1; the weight carrying plate 7 rotates therefore bodily with the driving shaft M.

Under the action of the centrifugal force the weights 10 are caused to pivot about their axles 9 and to move away, through the push-rods 13, the spider 15. The latter, acting through the bearing 19, displaces axially the spider 21 which in turn causes the plate 27, through the clutch springs 30, to engage the clutch disc 33. The weights continue their pivotal movement until the clutch is completely engaged, i. e. till the moment where the shoulders 13' of the push-rods 13 are engaging the plate 7, thereby preventing further travel of the masses and thus limiting their thrust on said disc 33.

It will be immediately seen that for letting in the clutch the torque capacity of the electromagnet 41 need only be great enough to drive the weight carrying device, its function merely consisting in initiating the rotation which causes the weights 10 to operate under the action of the centrifugal force. The driving torque is transmitted from the driving shaft to the driven shaft through the centrifugal clutch alone.

After having described the operation for letting in the clutch, we will now describe its disengagement, which corresponds to the lever L being restored to neutral position, i. e. to position $O_1$. When leaving contact 46, lever L opens the circuit of the rotating electromagnet 41, and when coming into position $O_3$, it causes current to flow through the stationary electromagnet 37. Said electromagnet now attracts the armature 50 which is braked, as well as the plate 7 the centrifugal weights of which are restored into their rest position under the action of the return springs 25. The plate 27 and the spider 21 are also restored into their inoperative position by the spider 15. Therefore the clutch disc 33 is completely disengaged.

It is to be noted that when the clutch is employed in combination with a member for controlling the engagement of first speed and neutral in a change speed gear associated with the clutch, it is indispensable that the angle $\beta$ be substantially larger than the angle $\alpha$, because, when bringing back the lever L from $O_4$ to $O_1$ the disc 33 must be disengaged (position $\beta$) before the first speed can be disengaged (position $\alpha$).

The device just described, which has been shown as electrically controlled, may be also controlled hydraulically, pneumatically, etc., as desired.

Figure 2:
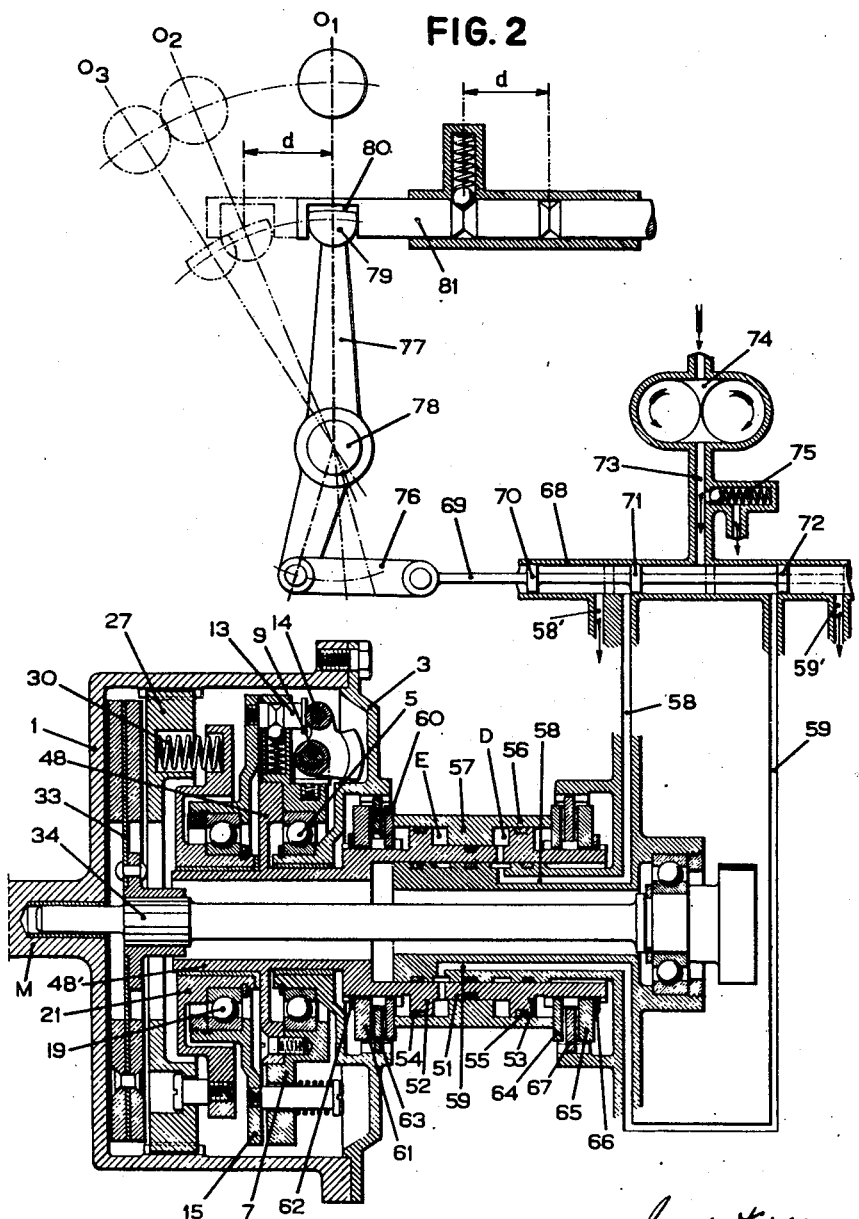
Fig. 2 is a similar view of the same clutch, wherein the auxiliary device controlling the operation of the weight carrying device is controlled hydraulically.

Referring now to Fig. 2 of the drawings, there will be described an embodiment of the invention with hydraulic control. Similar numerals refer to similar parts throughout the several views.

In this second embodiment, the hub portion 48' of the flange 48 (rigid with the plate 7) is formed with a cylindrical sleeve 51 outwardly projecting from the drum 1 and comprising a pair of circular ribs 52 and 53 supporting respectively sealing rings 54 and 55. The cylindrical sleeve 51 forms a guide for a piston 56 adapted to move axially. The central part of said piston comprises an annular rib 57 defining respectively a pair of annular chambers E and D with said ribs 52 and 53.

The sleeve 51 has mounted in the central part thereof a stationary distributing device rigid with the housing and comprising a pair of conduits 58 and 59 communicating respectively with the chambers E and D, through ports in the sleeve 51.

The end of the piston 56 adjacent to said drum 1 is adapted to operatively engage a disc 60 connected by splines for rotation with the sleeve 51 and spaced in a suitable manner from a second disc 61 splined on the same sleeve and retained by means of an abutment formed by a clip ring 62. The discs 60 and 61 comprise therebetween a sliding disc 63 connected for rotation with the drum 1 by means of splines formed in the plate 3.

The other end of piston 56 comprises a similar arrangement, i. e. a disc 64 operatively engaged by the associated end of the piston 56 and connected for rotation with the sleeve 51 by suitable splines having secured thereon, spaced from said disc 64, a second disc 65 held by a clip ring abutment 66. The discs 64 and 65 comprise therebetween a disc 67 angularly fixed but slidably mounted on suitably splines of the stationary part of the housing.

The conduit 58 is connected with a valve body 68 having mounted therein a slide valve 69 carrying pistons 70, 71 and 72; the part of the valve body arranged between the ports of the conduits 58 and 59 is connected through a duct 73 with an oil pump 74, said duct 73 comprising a relief valve 75.

The slide valve 69 is connected through a link 76 with the end of a speed change lever 77 pivoted at 78 and provided with a projection 79 adapted to engage selectively with a notch 80 in each of the respective striker-rods 81 of the associated change-speed gear. Only one striker-rod 81 is shown in the drawing, the other rods being disposed in a row behind that shown, so that the lever head 79 can be brought into selective engagement with the notch 80 of any striker rod by moving the lever 77 bodily along its pivot-shaft 78, the linkage 69, 76 to the valve being suitably arranged to permit such movement. Pivotal movement of the lever from position O (neutral) to position $O_2$ moves the selected striker-rod 81 from neutral to gear-engaged position. Lateral and pivotal movement of the change-speed lever 77 is effected by a lever such as the clutch-lever L shown in Fig. 1, which thus has the combined function of a change-speed lever and clutch-control lever. Pivotal movements between O, $O_2$ engage the selected speed, whereafter the lever head 79 leaves the notch 80 and during further pivotal movement to the position $O_3$ the valve 70—72 operated to cause engagement of the clutch.

Assuming the different parts of the device be in the neutral position, the device operates as follows:

As soon as the engine rotates, the pump 74 causes liquid to flow, at a pressure controlled by an adjustable relief valve 75 through duct 73, valve body 68 (the slide valve 69 of which is in the position shown in the drawing), duct 59, into chamber E, thereby causing piston 56 to move to the right side in Fig. 2. By this movement, the discs 64 and 65 rigid with the sleeve 51 are caused to frictionally engage the stationary disc 67, thereby maintaining the weight carrying plate which is rigid with the sleeve 51, stationary.

During movement of the speed change lever 77 from position $O_1$ to position $O_2$, the direction of flow of fluid under pressure remains the same.

When said speed change lever 77 has come into position $O_2$, which corresponds to the movement by which the desired speed is selected, its projection 79 leaves the notch 80 of the bar 81, after which lever 77 further moves from position $O_2$ to position $O_3$. At this moment, pistons 70 and 72 of the slide 69 move to the right hand side of the discharge ducts 58' and 59' of the valve body 68 respectively, while piston 71, which is the central piston, moves to the right side of the feeding duct 73. This reverses the direction of flow of the fluid under pressure which now flows through duct 58 into the chamber D, while chamber E is connected through duct 59 with the discharge duct 59'. This causes the piston 56 to move toward the left in Fig. 2, thereby disengaging the brake assembly 64—65—67 and engaging the clutch assembly 60—61—63, thus coupling the weight carrying plate with the drum 1 of the clutch.

When lever 77 is returned from position $O_3$ to position $O_2$ in order to change speed, the direction of flow of the fluid under pressure is again reversed, which causes, on the one hand, disengaging of the parts 60, 61, 63 and therefore disengaging of the weight carrying plate from the drum, and on the other hand, engaging of the parts 64, 65, 67 and therefore braking of said plate before the initiation of return of lever 77 to the neutral point and engaging of the next speed, said operation always being effected whilst the weight carrying plate is stationary. Chamber D is evacuated through relief duct 58'.

Instead of the mechanical retaining device of the centrifugal weights 10 which comprises the groove 16 (Fig. 1) formed in the push-rod 13 and cooperating with the ball 17 urged into engagement therewith by said spring 18, there may be other forms of electric control for starting and stopping (clutch and electromagnetic brake) the weight carrying plate of the clutch shown in Fig. 1.

Figure 3:
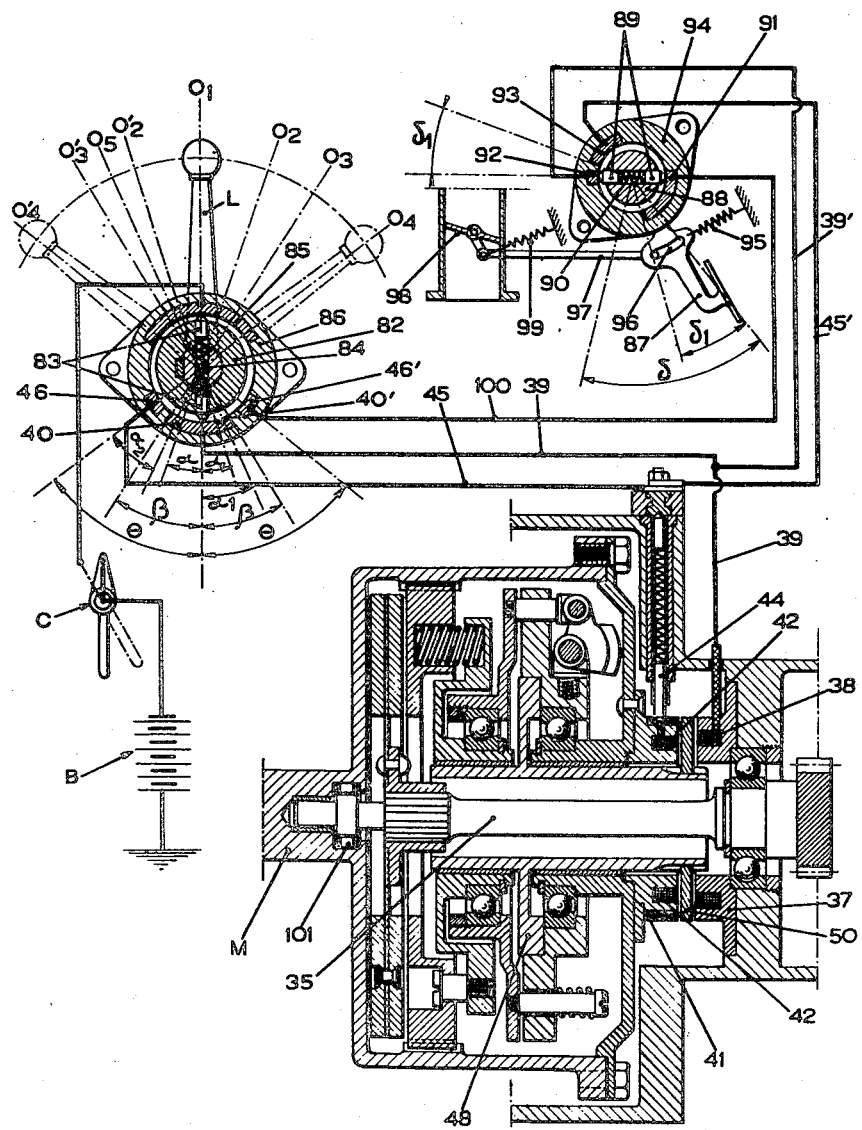
Fig. 3 is a similar sectional view of the clutch of Fig. 1, where the electric circuits are controlled by the speed change lever and by the throttle pedal.

Referring now to Fig. 3, the retaining device is replaced by a system for controlling the weight carrying plate so that the circuits of the electromagnets of the electromagnetic clutch and of the electromagnetic brake are controlled simultaneously by the speed change lever L and by the throttle pedal of the engine. The change-speed lever L acts in this case in the following manner. In the forward position $O_4'$, the lever permits selection, by means not shown, of first speed forward or reverse, i. e. the starting speeds, whilst in its rearward position $O_4$ the lever permits selection, also by means not shown, of all other forward speeds than the first.

In a modified form of embodiment shown in Fig. 4, the circuits of said electromagnets are simultaneously controlled by the change speed lever and by a centrifugal control switch driven by the engine.

Referring again to Fig. 3, the change speed lever L is shown as adapted to actuate a rotary switch comprising a central hub member 82 of insulating material having slidably mounted therein a pair of contact fingers 83 urged away from each other by a spring 84 and forming brushes adapted to complete an electric circuit between a fixed segmental member 85 and either a second segmental member 40 (pivoted with a notch 40') or contacts 46 and 46', said segmental members 85 and 40 as well as said contacts 46 and 46' being suitably arranged in an insulating housing 86.

As in the case of Fig. 1, the lever L starts from the neutral position $O_1$, ensures at $O_2$ the engagement of a speed, at $O_3$ the opening of contact 85—40 and finally at $O_4$ the closing of contact 85—46.

According to said embodiment, the lever L may also move through a series of symmetrical positions $O_2'$, $O_3'$ and $O_4'$, in order to engage another speed, in which (i. e. when lever is at $O_4'$) contact is ensured between segmental member 85 and contact 46'.

As above stated, contact 46' (or other contacts electrically connected therewith) is associated with the starting speeds of the vehicle (reverse and first speed forward), all other speeds being associated with contact 46 (or other contacts electrically connected therewith).

Besides, the throttle pedal 87 is, in this embodiment of our invention, connected with an electric switch the insulated central hub member 88 of which has slidably mounted therein a pair of contact fingers 89 urged to move outwardly from each other by a spring 90 and forming brushes adapted to complete an electric circuit between a segmental member or contact 91 and either a contact 92 or a segmental member 93, said segmental members and contacts being mounted in a stationary insulating housing 94. The pedal 87, which is urged into normal position by a spring 95 has a slot 96 which permits, after turning to an angle $\delta_1'$, to actuate a pin on a rod 97 which ensures the opening of the throttle 98 so as to let gas enter into the engine, said throttle being urged into closed position by a spring 99. The aforementioned contact 46' is connected with the segmental member 91 through a wire 100; the contact 92 is connected with the wire 39 (abutting to the segmental member 40) through a wire 39'; finally, the segmental member 93 is connected through a wire 45' with the brush 44 arranged for feeding current to the winding 42 of the electromagnetic clutch of the mechanism.

The device shown in Fig. 3 operates as follows:

Assuming the ignition switch C is closed and the engine idling, pedal 87 is maintained in inoperative position (shown in Fig. 3) by the spring 95, the throttle 98 being closed by the spring 99. Lever L being in position $O_1$, the winding 38 of the electromagnetic brake receives current directly through wire 39. Therefore the fixed electromagnet 37 of said electromagnetic brake attracts the armature 50, thereby causing the weight carrying plate 7—48 of the centrifugal clutch to be stopped. Now the engine may be raced without the clutch being operative.

When lever L is turned from position $O_1$ to position $O_4'$ to select the first speed (forward or reverse driving), current flows from contact 46' through wire 100, segmental member 91, contact 92 and wire 39 and still to the winding 38 of the electromagnetic brake. As soon as the vehicle is desired to be started and the throttle pedal urged downwardly, said pedal 87 first moves through an angle $\delta_1$ where rod 97 is not actuated by said pedal by reason of said slot 96; at the end of the angle $\delta_1$ the segmental member 93 is connected with the segmental member 91 through the contact fingers 89 and current is cut off from the winding 38 and flows through the winding 42 of the electromagnetic clutch into which it is fed by a wire 45'. Thus the rotating electromagnet 41 attracts the armature 50, thereby starting rotation of the weight carrying plate 7—48, which causes the clutch to be engaged. During further movement of the throttle pedal 87 (through angle $\delta$), the winding 42 remains energized and the throttle is opened in the usual manner.

When the throttle pedal is released, it is returned into normal position by the spring 95. Thus current no longer energizes the winding 42 of the electromagnetic clutch but flows again through the winding 38 of the electromagnetic brake, thereby causing the clutch to be disengaged. There is provided between the driven shaft 35 and the driving shaft M a reversely acting free wheel 101 which transmits engine-braking torque at all speeds.

In order to pass to a higher speed, lever L is turned from position $O_4'$ to position $O_4$ through position $O_1$. Thus the conditions of the above described example are repeated: said operation causes successively disengaging of the clutch, leaving the previously selected first speed, selecting of the desired higher speed and letting in of the clutch.

It is to be noted that before the starting speed is disengaged to pass to a higher speed, disengaging of the clutch is caused by proceeding in the usual manner, i. e. by releasing the throttle pedal 87 before speed changing. In any case, it will be seen that the disengagement of the clutch is always ensured automatically by lever L as soon as the contact fingers 83 leave the contact 46' and engage the segmental member 40 which is connected through wire 39 with the winding 38 of the electromagnetic brake of the device.

It should be noted that, in the position $O_4$, current is fed directly to the clutch winding 42 through the lead 45, so that when running in this position, i. e. in speeds other than first or reverse, automatic declutching on release of the accelerator pedal 87 does not occur.

Referring now to Fig. 4, the general arrangement of the speed change control is similar to that shown in Fig. 3.

In this example, control of the circuits of the winding 42 of the electromagnetic clutch and of the winding 38 of the electromagnetic brake is effected through a centrifugal governor 102 driven by the engine. Said governor is adapted to control an electric switch the fixed housing 103 of which, which is made from insulating material, comprises a segmental member or contact 104 and a pair of contacts 105—106. The rotative hub member 107 of said switch comprises a pair of contact fingers 108 slidably mounted therein and urged to move outwardly from one another by a spring 109; said contact fingers are adapted to selectively connect said segmental member 104 to either the contact 105 or the contact 106, the hub member of the switch being connected through an arm 110 with the centrifugal governor 102.

Said centrifugal governor 102 is adjusted in such a manner that beyond a predetermined speed which is somewhat higher than the idling speed of the engine it causes movement of the lever 110 from position R to position S, and conversely, when the speed of the engine goes down beyond the predetermined speed, it returns lever 110 from position S to position R.

The segmental member 104 of the switch is connected through a wire 111 with the contacts 46 and 46'. The contact 105, which corresponds to the low speed of the engine is connected through a wire 39'' to wire 39, and the contact 106, which corresponds to the high speed, is connected through a wire 45'' to the winding 42 of the electromagnetic clutch.

The device shown in Fig. 4 operates in the following manner:

Contact C being closed, the engine idling and the lever L being in position $O_1$, the winding 38 of the electromagnetic brake is directly energized through a wire 39. Therefore the stationary electromagnet 37 attracts the armature 50 and stops the weight carrying plate 7—48; now the engine may be raced without operation of the clutch.

When lever L is returned from position $O_1$ to position $O_4'$ whilst selecting the desired first speed or reverse, a current flows through wires 111 and 39'', and still through the winding 38. If the vehicle is desired to be started, it is merely necessary to race the engine which, by driving the centrifugal device 102, causes the lever 110 to move from position R to position S: now current no longer flows through the winding 39 of the electromagnetic brake but flows through the winding 42 of the electromagnetic clutch. The electromagnet 41 attracts now its armature 50 and starts rotation of the weight carrying plate 7—48, thereby causing the clutch to be let in.

Conversely, when the vehicle is slowed down, and as soon as the speed of the engine comes down beyond a selected adjusted speed, the centrifugal device 102 returns the lever 110 from position S to position R; now a current flows again through wire 39'' to energize the winding 38 of the fixed electromagnet 37 of the electromagnetic brake which stops the armature 50 and the weight carrier 7—48, thereby disengaging the clutch. A similar automatic disengagement occurs in position $O_4$ for selecting the higher ratios.

The description on pages 14 and 15 should explain that Figures 3 and 4 differ in that, in the former automatic declutching (on release of the accelerator pedal) occurs only in the starting speeds (position $O_4'$) whilst in the latter, automatic declutching (below a predetermined engine-speed) occurs in all ratios (position $O_4$ as well as $O_4'$).

In both embodiments described hereinbefore and shown in Figs. 3 and 4, the segmental member or contact 40 has formed therein, near the contacts 43' corresponding to the starting speeds, notches 40' provided to offer a certain resistance to movement of the lever L, said resistance being felt by the hand of the driver, by reason of the spring 84 which urges the contact fingers 83 to move outwardly from each other. Said notches are arranged on the segmental member at an angle $a_1$ somewhat larger than the angle $a$.

Said notches aim to permit the obtainment whilst starting, of a higher driving torque than that corresponding to the idling torque, by racing the engine without letting in the clutch. This may be done when lever L is in position $O_5$, corresponding to angle $a_1$. To let in the clutch it is sufficient to move the lever L suddenly from position $O_5$ to position $O_4'$.

It will be seen that the method of actuating the weight carrying plate may replace the mechanical locking device 16—17—18 previously described. This is due to the fact that the throttle pedal is merely to be depressed in order to obtain, without any other operation, starting of the vehicle, if the engine is idling and if the speed change lever L is in position for first speed or reverse.

It should be well understood that the embodiments above described have been given merely by way of example and have no limitative character.

What we claim is:

1. In a system including a fixed frame, a clutch device which comprises, in combination, two coaxial rotary members, to wit a driving one and a driven one, movable relatively to each other into and out of cooperating engagement, a weight carrier coaxial with said members, centrifugal weights movably mounted on said carrier, a part rotatably coupled with said carrier coaxially therewith but otherwise movable with respect thereto, said part being operatively connected with at least one of said weights to be moved with respect to said carrier in response to centrifugal displacements of said weights, antifriction means interposed between said part and at least one of said members for bringing said members into cooperating engagement with each other in response to movements of said part relatively to said carrier due to centrifugal displacements of said weights, and auxiliary clutch and brake means for alternately coupling said carrier with said driving member and braking it with respect to said fixed frame.

2. In a system including a fixed frame, a clutch device which comprises, in combination, two coaxial rotary members, to wit a driving one and a driven one, axially movable with respect to each other into and out of cooperating engagement, a weight carrier coaxial with said members, centrifugal weights movably mounted on said carrier, a part coaxial with said members, friction reducing means for linking said part with one of said members in the axial direction while ensuring free relative rotation of said part and said last mentioned member, means for coupling said part in rotation with said carrier while permitting free relative axial movement of said part and said carrier, means operative by said weights for axially moving said part with respect to said carrier in response to centrifugal displacements of said weights, and auxiliary clutch and brake means for alternately coupling said carrier with said driving member and braking it with respect to said fixed frame.

3. In a system including a fixed frame, a clutch device which comprises, in combination, two coaxial rotary members, to wit a driving one and a driven one, axially movable with respect to each other into and out of cooperating engagement, a weight carrier coaxial with said members, centrifugal weights movably mounted on said carrier, a part coaxial with said members, a ball thrust bearing for transmitting axial displacements of said part to one of said members, longitudinally sliding means for coupling said part in rotation with said carrier, means operative by said weights for axially moving said part with respect to said carrier in response to centrifugal displacements of said weights and auxiliary clutch and brake means for alternately coupling said carrier with said driving member and braking it with respect to said fixed frame.

4. In a system including a fixed frame, a clutch device which comprises, in combination, two coaxial rotary members, to wit a driving one and a driven one, axially movable relatively to each other into and out of cooperating engagement, a drum rigid with one of said elements surrounding the whole, a weight carrier coaxial with said members journalled in said drum, centrifugal weights movably mounted on said carrier, a part rotatably coupled with said carrier coaxially therewith but otherwise movable with respect thereto, said part being operatively connected with at least one of said weights to be moved with respect to said carrier in response to centrifugal displacements of said weights, antifriction means interposed between said part and at least one of said members for bringing said members into cooperating engagement with each other in response to movements of said part relatively to said carrier due to centrifugal displacements of said weights, and auxiliary clutch and brake means on the outside of said drum for alternately coupling said carrier with said driving member and braking it with respect to said fixed frame.

5. In a system including a fixed frame, a clutch device which comprises, in combination, a driving drum, a driven member coaxially rotatable therein, an annular disc longitudinally slidable in, and connected for rotation with, said drum, a first spider coaxial with said disc longitudinally slidable with respect thereto and coupled for rotation therewith, spring means for elastically transmitting axial displacements from said spider to said disc, a second spider coaxial with the first one, a ball thrust bearing for transmitting axial displacements of said spiders to each other, a weight carrier journalled in said drum coaxially therewith, longitudinal push rods fixed to said second spider slidably guided in said carrier in the axial direction, centrifugal weights movably mounted on said carrier in cooperating engagement with said push rods so as axially to move said second spider in response to centrifugal displacements, and auxiliary clutch and brake means for alternately coupling said carrier member with said driving drum and braking it with respect to said fixed frame.

6. In a system including a fixed frame, a clutch device which comprises, in combination, two coaxial rotary members, to wit a driving one and a driven one, axially movable relatively to each other into and out of cooperating engagement, a weight carrier coaxial with said members, centrifugal weights movably mounted on said carrier, a part rotatably coupled with said carrier coaxially therewith but otherwise movable with respect thereto, said part being operatively connected with at least one of said weights to be moved with respect to said carrier in response to centrifugal displacements of said weights, antifriction means interposed between said part and at least one of said members for bringing said members into cooperating engagement with each other in response to movements of said part relatively to said carrier due to centrifugal displacements of said weights, auxiliary clutch and brake means for alternately coupling said carrier with said driving member and braking it with respect to said fixed frame, and electromagnetic means for operating said auxiliary clutch and brake means.

7. In a system including a fixed frame, a clutch device which comprises, in combination, two coaxial rotary members, to wit a driving one and a driven one, axially movable relatively to each other into and out of cooperating engagement, a weight carrier coaxial with said members, centrifugal weights movably mounted on said carrier, a part rotatably coupled with said carrier coaxially therewith but otherwise movable with respect thereto, said part being operatively connected with at least one of said weights to be moved with respect to said carrier in response to centrifugal displacements of said weights, antifriction means interposed between said part and at least one of said members for bringing said members into cooperating engagement with each other in response to movements of said part relatively to said carrier due to centrifugal displacements of said weights, auxiliary clutch and brake means for alternately coupling said carrier with said driving member and braking it with respect to said fixed frame, and fluid actuated means for operating said auxiliary clutch and brake means.

MICHEL GRAVINA.
MARCEL HAWADIER.

REFERENCES CITED

The following references are of record in the file of this patent:

UNITED STATES PATENTS

| Number | Name | Date |
|---|---|---|
| 1,193,192 | Feltz | Aug. 1, 1916 |
| 2,074,510 | Junkers | Mar. 23, 1937 |
| 2,153,509 | Rockwell | Apr. 4, 1939 |
| 2,183,481 | Johnson | Dec. 12, 1939 |
| 2,232,454 | Haupt | Feb. 18, 1941 |
| 2,248,377 | Nutt | July 8, 1941 |